Patented Sept. 4, 1951

2,566,791

UNITED STATES PATENT OFFICE 2,566,791

STABILIZATION OF POLYMERIZED CHLORO-SUBSTITUTED ETHYLENES

Charles J. Chaban, Toledo, Ohio, assignor to Stabelan Chemical Company, Toledo, Ohio, a partnership No Drawing. Application December 13, 1949, Serial No. 132,798

12 Claims. (Cl. 260—45.5)

The invention relates to the stabilization of products of the polymerization of a composition comprising an alpha-chloro-substituted ethylene having from one to two alpha-chloro substituents. Such polymerization products include synthetic resins intended for use in various applications, including transparent, translucent, uncolored, dyed, pigmented or filled films, coatings, filaments, and moldings. The invention relates particularly to the incorporation, with such polymerization products, of agents that improve their stability and durability.

One of the principal limitations on the usefulness of such polymerization products is their limited resistance to light and heat and their limited stability or durability when subjected to flexing, abrasion or outdoor exposure. Polymerized polyvinyl chloride, for example, when subjected to outdoor exposure or to an accelerated weathering test or a carbon arc fadeometer test, turns brown or black and becomes brittle in a relatively short time, particularly when it is in the form of a transparent or translucent film or filament which is not protected by the opacifying action provided by the presence of fillers or pigments.

The principal object of the invention is to produce a very marked improvement in the light resistance, heat resistance, weather resistance, abrasion resistance and resistance to flexing both at ordinary temperatures and at subnormal temperatures of such polymerization products. More specific objects and advantages are apparent from the description, which discloses and illustrates but is not intended to limit the scope of the invention.

A stabilized composition embodying the invention is an alkaline composition comprising (a) the product of the polymerization of a composition comprising an alpha-chloro-substituted ethylene having from one to two alpha-chloro substituents and (b) a reducing agent that is a salt having an anion of the class consisting of the $[S_2O_4]^=$ and $[SXO_3]^=$ anions, wherein X is a chalkogen having an atomic weight between 30 and 80, intimately incorporated with said polymerization product in an amount from 1 to 20 per cent of the weight thereof. The incorporation of such a reducing agent greatly improves the stability and durability of such a polymerization product.

The stabilized composition of the present invention is quite different from the composition produced in accordance with British Patent No. 444,636. That patent discloses the step of treating a chlorinated rubber solution, immediately after chlorination, with an antichlor to remove loosely bound chlorine. In accordance with the British patent, the step of treating the chlorinated rubber solution with an antichlor is carried out by mixing or emulsifying the non-aqueous chlorinated rubber solution with an aqueous phase consisting of an aqueous solution of the antichlor, and then precipitating the chlorinated rubber from the two-phase system. The patent states that the chlorinated rubber produced by such treatment contains only "residual traces" of the antichlor and that it "is preferably washed very thoroughly with water to remove" such residual traces. The patent states that one of the purposes of such treatment of the chlorinated rubber is to make it unnecessary to incorporate a stabilizing agent after the chlorinated rubber is produced.

In contrast, the polymer that is stabilized in the practice of the present invention is not chlorinated rubber but is the product of the polymerization of an alpha-chloro-substituted ethylene having from one to two alpha-chloro substituents. Since the product of the polymerization of such a compound does not contain loosely bound chlorine and is not a chlorinated polymer, it was not obvious to treat the product of the polymerization of such a compound with a reducing agent. Moreover, the reducing agent that is present in a composition embodying the invention, in an amount from 1 to 20 per cent of the weight of the polymerization product, performs a wholly new function that was not performed by the antichlor in the process disclosed by the British patent.

In order that the reducing agent in the composition of the present invention may perform its novel function, the reducing agent must be present in the composition in an amount from 1 to 20 per cent of the weight of the polymerization product, so that there is a reserve of the reducing agent that gradually is consumed over a period of years as it performs its function. This function, in the performance of which the reducing agent is consumed over a period of years, is not performed by the antichlor in the process disclosed by the British patent, because in that process the antichlor is only present in a separate liquid phase during the preparation of the chlorinated rubber, and the chlorinated rubber that is prepared contains no more than mere residual traces of the antichlor.

The novel function of the reducing agent in a composition embodying the invention is believed to consist in part in reacting with nascent oxygen. The elimination of nascent oxygen from the polymerization product is believed to improve the stability and durability of the polymerization product because nascent oxygen, which may be produced by heat and light from molecular oxygen which has entered the composition from the atmosphere, has a tendency to rupture a carbon chain in which a double bond may occur, with the formation of aldehyde or even carboxylic acid groups at the broken ends of the chain. The presence of such broken chains impairs the properties of the polymerization product and causes it to discolor more readily under the influence of heat and light. Thus, by such action of the reducing agent used in the practice of the invention, the polymerization product is protected for a considerable period of time against the degrading effect of nascent oxygen. The nascent sulfur or selenium produced by decomposition of the reducing agent may also combine with chain molecules containing double bonds to produce branch- or cross-polymerization which inhibits the rupturing action of nascent oxygen and improves the properties of the composition.

Many of the reducing agents used in the practice of the invention are alkaline and are believed to have an additional beneficial function because of their alkalinity. This additional beneficial function is to neutralize acidity such as the acidity produced by the formation of carboxylic acid groups at the broken ends of the chains when rupturing by the action of nascent oxygen has taken place. Formation of acidity may occur also in the case of vinyl or vinylidine chloride polymers and copolymers when a hydrogen molecule and a halogen molecule are split off from two adjacent carbon atoms to form a hydrogen halide molecule, leaving a double bond between the two adjacent carbon atoms. The formation of such double bonds causes darkening of the composition and may lead to rupturing of the molecules by nascent oxygen as explained hereinbefore.

The neutralization of such acidity is believed to be beneficial because acidification of the polymerization product is believed to cause auto-acceleration of the degradation reactions by which the acidity is produced. The beneficial action of the reducing agents used in the practice of the invention cannot be explained on the ground of alkalinity alone, however, because the improvement produced by the incorporation of the present agents is far greater than the improvement that can be produced by the mere incorporation of an alkaline substance.

In order to permit the reducing agent in a composition embodying the invention to exert the novel function in the performance of which it is consumed over a period of years, it is necessary that the composition be alkaline. Alkalinity is necessary because of the fact that a salt having a $[S_2O_4]^=$ or $[S_2O_3]^=$ or $[SSeO_3]^=$ anion cannot exist in an acid medium. The reducing agent used in the practice of the invention cannot exist in an acid medium because such a salt upon being introduced into an acid medium is immediately converted to the corresponding acid, which is unstable and decomposes. A composition embodying the invention, therefore, must be alkaline in order that there may be provided in the composition a reserve of the reducing agent that is gradually consumed over a period of years in the performance of its function.

A composition embodying the invention is quite different from the composition produced in accordance with the disclosure of U. S. Patent No. 2,227,985. That patent discloses a treatment with a sulfur acid in which the valence of the sulfur is less than 4, during the preparation of polyvinyl acetal resin. The patent states that the sulfur acid "may be in the form of one of its salts, as the reaction mixture is of an acid nature and will convert the salt into the corresponding acid." In the process disclosed by the patent the sulfur acid later is washed out completely from the polyvinyl acetal resin.

The sharp improvement that is obtained in the practice of the present invention by preparing a composition containing an amount of a salt sufficient to provide a reserve that is consumed only over a period of years, over the process disclosed by Patent No. 2,227,985 which consists in treatment with a sulfur acid, has been demonstrated experimentally. In that experimental demonstration three compositions were prepared. The second of the three compositions was a composition embodying the invention. The first composition was the same as the second composition except that the reducing agent was omitted from the first composition. The third composition was the same as the second composition except that sufficient hydrochloric acid was added to the third composition to render it acid. Although one specific composition embodying the invention was prepared as the second of these three compositions, the results of these experiments are typical of the results obtained when any other composition embodying the invention is used. Hydrochloric acid was incorporated in the third composition in accordance with the disclosure of Patent No. 2,227,985. That patent teaches only the use of acid conditions, and in every example in the patent hydrochloric acid is added to provide the acid conditions required by the disclosure of the patent. The fact that the patent discloses merely a treatment in solution during the preparation of a resin, whereas the present invention relates to a composition containing a reducing agent that is consumed over a period of years, made it difficult to make a comparison. However, by showing the effect of acidity, the experiments demonstrated an essential difference between the present invention and the process disclosed by the patent. The three experiments were carried out as follows:

Composition 1 was prepared by milling a high molecular weight copolymer of 96 parts of vinyl chloride and 4 parts of vinyl acetate with 45 parts of diethylhexylphthalate, 5 parts of tricresyl phosphate and 0.75 part of stearic acid for ten minutes on a two-roll rubber mill at 300–310 degrees F. The resulting composition was calendered for five minutes on a three-roll calender at 300 to 310 degrees F. to produce a yellow-colored film having a thickness of 0.010 inch.

A composition embodying the invention, composition 2, was prepared by a procedure which was the same as that used for the preparation of composition 1 except that a reducing agent (5 parts of $Na_2S_2O_3.5H_2O$) was also incorporated into the mixture during the milling. The resulting composition was calendered for five minutes on a three-roll calender at 300 to 310 degrees F. to produce a cream-colored film having a thickness of 0.010 inch.

Composition 3 was prepared by a procedure which was the same as that used for the preparation of composition 2 except that concentrated hydrochloric acid (10 parts) was also incorporated into the mixture during the milling, and the amount of stearic acid used was 3 parts. During the milling there was a tendency for the material to stick to the rolls. The resulting composition was calendered for five minutes on a three-roll calender at 300 to 310 degrees F. to produce a light brown film having a thickness of 0.010 inch.

Films of compositions 1, 2 and 3 were subjected to a heat aging test by heating them at a temperature of 350 degrees F. in a convection oven (in which the temperature was controlled by an electrical thermostat) for periods of time such as 15 minutes, 30 minutes, 45 minutes and 60 minutes. Such tests determine the resistance of films to deterioration or aging by the action of heat. The results of the tests were as follows:

A film of composition 1, after 15 minutes in the oven, was dark yellow in color; after 30 minutes in the oven, the film was brown in color; after 45 minutes in the oven, the film was dark brown in color; and the film had not changed from its dark brown color after 60 minutes in the oven. A film of composition 2, after 15 minutes in the oven, was reddish tan in color; after 30 minutes in the oven, the film had a slightly darker reddish tan color; and the film had not changed any further in color after 60 minutes in the oven. A film of composition 3, after 15 minutes in the oven, was dark brown in color; and after 30 minutes in the oven, the film was black.

Other films of compositions 1, 2 and 3 were subjected to a standard fadeometer test, which consists in exposing films to ultra-violet light from a carbon arc in an Atlas FDA Fadeometer at 125 degrees F. The test determines the resistance of films to deterioration by the action of ultra-violet light (as evidenced by uniform discoloration).

A film of composition 1 was brown in color after 42 hours of exposure and dark brown in color after 85 hours of exposure. A film of composition 2 showed no appreciable discoloration after 209 hours of exposure. A film of composition 3 was brown in color after 26 hours of exposure and dark brown in color after 42 hours of exposure.

Other films of compositions 1, 2 and 3 were subjected to an accelerated weathering test in a standard Weatherometer unit (a National Carbon Model X—1—A unit). A film of composition 1 was light brown in color after 42 hours of exposure and dark brown in color after 75 hours of exposure. A film of composition 2 showed no appreciable discoloration after 225 hours of exposure. A film of composition 3 was brown in color after 18 hours of exposure, dark brown in color after 42 hours of exposure and black after 59 hours of exposure.

Composition 2 was distinctly alkaline despite the fact that a small amount of stearic acid was used as a lubricant. (Stearic acid is such a weak acid that it did not appreciably reduce the alkalinity of the composition.) As the results of the above experiments indicate, an alkaline composition (composition 2) which comprises (a) the product of the polymerization of a composition comprising an alpha-chloro-substituted ethylene (vinyl chloride) and (b) a reducing agent (sodium thiosulfate) showed a remarkable improvement in stability (i. e., resistance to light, heat and weather) over a composition (composition 1) which comprised the polymerization product but did not comprise the reducing agent. Furthermore, the improvement in stability which was obtained with the reducing agent in an alkaline composition comprising the polymerization product was not obtained when the reducing agent was incorporated in a composition (composition 3) which comprised the polymerization product but was acid. In fact, the stability of the latter composition was actually inferior to that of the composition comprising the polymerization product but no reducing agent.

In the preparation of a composition embodying the invention, the polymerization product need not be in an alkaline condition before the reducing agent is incorporated if the reducing agent is itself alkaline, or if an alkaline substance is also incorporated so that an alkaline composition is obtained. (The term "alkaline composition" is used herein to mean a composition having a pH from 7 to 12, although in most cases a composition embodying the invention has a pH at the lower end of such range (i. e., a pH from about 7½ to about 8).) If the polymerization product is not already in an alkaline condition, and if the reducing agent used is not an alkaline substance, a composition embodying the invention may be prepared by the addition of an alkaline substance to the polymerization product either before, simultaneously with or after the incorporation of the reducing agent in the polymerization product. However, the procedure used should not be such that the reducing agent is acidified, because acidification would convert the reducing agent into the corresponding unstable acid. The alkaline substance thus employed preferably is a weakly basic substance when it is to be incorporated in a solid composition, because it is difficult to disperse a strong base in a solid composition finely enough so that the composition is free of loci of excessive alkalinity. Any weak organic or inorganic base may be used. The choice of the base may be determined by its physical properties. For example, sodium metaborate may be used as the base when a transparent product is desired, and calcium carbonate may be used as the base when an opaque product is to be produced. The proportion of the alkaline substance used depends upon its alkalinity and is simply an amount sufficient to produce an alkaline composition, i. e., a composition having a pH from 7 to 12.

The pH of the composition may be measured by agitating for five minutes a distilled water suspension of a finely divided sample of the composition and then testing in a Beckmann pH meter in the customary manner or, more rapidly, by the use of the Gramercy Universal Indicator, i. e., by violently shaking a finely divided sample (about 1 gram) of the composition and distilled water (10 ml.) in a test tube for five minutes, adding the Universal Indicator (0.5 ml.), and determining the pH of the water by comparison with the Gramercy color chart. The distilled water should be boiled before use to remove carbon dioxide.

A composition embodying the invention comprises the product of the polymerization of a composition comprising an alpha-chloro-substituted ethylene having from one to two alpha-chloro substituents. An alpha-chloro-substituted ethylene having from one to two alpha-chloro substituents is vinyl chloride or vinylidene chloride. The term "product of the polymerization" as used herein includes polymers and copolymers. Mixtures of polymers with copolymers or with polymers may be used in compositions of the invention. Thus, a composition embodying the invention may comprise a polymer of vinyl chloride or vinylidene chloride, or mixtures of such polymers with one another or with polymers of one or more substances whose molecule contains a polymerizable olefinic double bond (e. g., vinyl acetate, methyl methacrylate, ethyl methacrylate, methyl acrylate and chloroprene). A polymerization product in a composition embodying the invention may also be a copolymer of vinyl chloride with vinylidene chloride, or a copolymer of either vinyl chloride or vinylidene chloride with a substance whose molecule contains a polymerizable olefinic double bond, alone or in admixture with another polymer or copolymer of such a substance.

In general, when the composition whose polymerization product is contained in a composition embodying the invention does not consist entirely of vinyl chloride and/or vinylidene chloride, it should consist of at least 50 per cent of either of those substances or a mixture thereof. Ordinarily, at least 85 per cent of the polymerization product is derived from vinyl chloride and/or vinylidene chloride. (The terms "per cent" and "parts" are used herein to mean per cent and parts by weight unless otherwise specified.) At least 25 per cent of a composition embodying the invention should consist of such a polymerization product. The remainder of the composition may consist not only of the reducing agent, but also of fillers, other polymers, and/or other ingredients. Because of the presence of the reducing agent, plasticizers and other ingredients, such a polymerization product usually does not make up more than about 75 per cent of a composition embodying the invention.

The reducing agent in a composition embodying the invention may be anhydrous or may contain water of crystallization. It is preferable that the reducing agent employed in the practice of the invention contain water of crystallization, since many anhydrous reducing agents can be perfectly dispersed in a composition of the invention only with great difficulty if at all. Perfect dispersion is readily attained, on the other hand, with a hydrated reducing agent such as a hydrated thiosulfate of an alkali metal. Such hydrated reducing agents not only possess the functions hereinbefore described but also have the additional beneficial function of self-dispersion, i. e., they can be perfectly dispersed with no additional treatment.

The reducing agent in a composition embodying the invention is a salt having an anion of the class consisting of the $[S_2O_4]^=$ and $[SXO_3]^=$ anions, wherein X is a chalkogen having an atomic weight between 30 and 80. A chalkogen having an atomic weight between 30 and 80 is sulfur or selenium. Thus, a reducing agent in a composition embodying the invention is a hydrosulfite (i e., a salt having a $[S_2O_4]^=$ anion) or a thiosulfate or seleno-thiosulfate (i. e., a salt having a $[S_2O_3]^=$ or a $[SSeO_3]^=$ anion).

According to J. W. Mellor (A Comprehensive Treatise on Inorganic and Theoretical Chemistry, volume X, pages 508-510), there are two general formulas which may represent the structure of thiosulfuric acid:

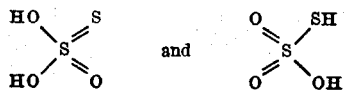

Much work has been done in support of and many reactions of thiosulfates have been cited in favor of both of these formulas. Some authorities believe that both forms of thiosulfuric acid (and its salts) can exist as isomers, and it is now assumed that a tautomeric change is involved:

It is generally supposed that the central sulfur atom is hexavalent, although it can be argued for both forms of thiosulfuric acid (and its salts) that the central sulfur atom is tetravalent. In aqueous solution thiosulfuric acid decomposes so rapidly that its existence is almost a purely theoretical concept. The fact that thiosulfuric acid does not decompose into sulfuric acid and hydrogen sulfide in aqueous solution (but decomposes into sulfurous acid and sulfur) detracts from the concept of thiosulfuric acid as having the formula $HO \cdot SO_2 \cdot SH$, since such a formula implies that thiosulfuric acid is a mixed anhydride of sulfuric acid and hydrogen sulfide. At the temperature of liquid air, in carbon dioxide solution, sulfur trioxide and hydrogen sulfide combine to give what is presumed to be the true thiosulfuric acid. In this compound the sulfur takes the place of negative, bivalent oxygen in sulfuric acid. Ordinary thiosulfuric acid must be an electronic isomeride of the true thiosulfuric acid, the additional sulfur atom being neutral. In the true thiosulfuric acid, the central sulfur atom is hexavalent; in the isomeride it is tetravalent. The difference is shown in the following coordination formulas:

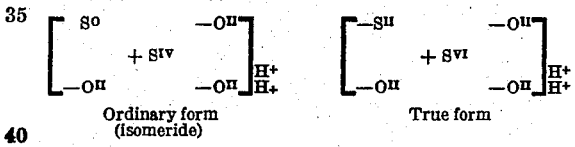

Ordinary form (Isomeride)     True form

In any case, a salt of thiosulfuric acid (a thiosulfate), whether its central sulfur atom is tetravalent or hexavalent and whether or not it exists in a tautomeric form, has a $[S_2O_3]^=$ anion. Thus, it is understood that the reducing agents that are herein termed to be salts having a $[S_2O_3]^=$ (or $[SSeO_3]^=$) anion may have a central sulfur (or selenium) atom that is a hexavalent or tetravalent, and may or may not be present in tautomeric form.

The reducing agents that may be used in the practice of the present invention include all organic, metal-organic and inorganic thiosulfates, such as ethylenediamine thiosulfate and other 1,2-alkylene diamine thiosulfates, sodium ethyl thiosulfate and the thiosulfates of light metals such as sodium, potassium, calcium, strontium and barium and heavy metals such as copper, cadmium, tin, lead and antimony; all inorganic seleno-thiosulfates, such as potassium seleno-thiosulfate; all inorganic hydrosulfites such as the hydrosulfites of sodium, potassium, calcium, strontium and barium; and complexes of such compounds with formaldehyde, such as the metallic sulfoxylate-formaldehyde complexes formed by reaction of formaldehyde with inorganic hydrosulfites.

It is understood that at least a portion of the reducing agent in a composition of the invention may undergo some decomposition during its incorporation in the polymerization product, so that the intermediate products of the decomposition of a reducing agent may be present in the final composition. For example, the reducing agent in a composition of the invention may comprise a polythionate, i. e., a salt having a $[S_xO_6]^=$ anion, wherein $x$ is an integer from 2 to 5. Often it is desirable that a thiosulfate or seleno-thiosulfate be accompanied by a trace of an inorganic sulfiite such as sodium sulfite in order to improve the stability of the thiosulfate or seleno-thiosulfate. The agents used in the practice of the invention may be of any good commercial grade. They may be either soluble or insoluble in water. The agents usually appear to interact to some extent with the resin in that the water soluble agents ordinarily are relatively inextractable by water after being dispersed in the resin.

It is preferable that the reducing agents used in the practice of the invention be thiosulfates of metals (particularly sodium, potassium, barium, cadmium, and lead thiosulfates), the most effective of which are the thiosulfates of the alkali metals. It is preferable also that compositions embodying the invention comprise (a) the product of the polymerization of a composition comprising vinyl chloride and (b) sodium thiosulfate. Preferably the sodium thiosulfate is in its hydrated form, i. e., $Na_2S_2O_3.5H_2O$, since, as hereinbefore stated, such a form permits the most intimate incorporation in the polymerization product. It is most desirable that the reducing agent in a composition of the invention comprise a mixture of sodium and lead thiosulfates, since ordinarily such a combination acts most effectively as a stabilizer. Usually lead thiosulfate may comprise from 10 to 50 per cent of the combination of lead thiosulfate and sodium thiosulfate.

The proportion of the reducing agent or mixture of reducing agents that is incorporated in a composition embodying the invention may range from the minimum amount capable of imparting an appreciable improvement in stability (i. e., about 1 per cent of the product of the polymerization of a composition comprising an alpha-chloro-substituted ethylene) to the maximum amount above which there is no important increase in stabilizing effect (i. e., about 20 per cent of the polymerization product). Although the reducing agent may be employed in a larger proportion than about 20 per cent of the polymerization product when a product of extremely high quality is required for heavy duty service, this is not usually necessary since in actual practice successive increases in the proportion of the reducing agent produce smaller and smaller improvements in the material. Of course, different proportions of different reducing agents must be added to the same composition in order to give the same results. Also the proportion of a given reducing agent to be added to the same composition in order to produce the same results varies with the degree to which the reducing agent is dispersed in the composition, because the effectiveness of each reducing agent increases with the degree of dispersion. Ordinarily, the most effective results are obtained when the proportion of the reducing agent in a composition embodying the invention is from about 5 to about 10 per cent of the polymerization product.

Although the presence of the reducing agent in the polymerization product produces a very marked improvement, it does not produce a violent effect like the presence of a catalyst during the polymerization of an unsaturated compound. In the polymerization of an unsaturated compound, to prevent the polymerization from becoming too violent and to prevent inferior polymers from being produced, a catalyst is used in a concentration that is only a small fraction of the concentration of the agent used in the present method which gives an appreciable improvement in the properties of the composition to which it is added. Although the concentration of a polymerization catalyst is minute as compared with the concentration of the reducing agent used in the present method, it heretofore has been thought to be desirable to remove even the relatively small trace of polymerization catalyst that remains after the polymerization.

A composition embodying the invention may comprise other substances in addition to a polymerization product and a reducing agent, as hereinbefore described. Plasticizers, lubricants, fillers, pigments or opacifiers may be incorporated in a composition of the invention. The composition may be a solid or liquid composition and may be in the form of a solution in an active solvent, a dispersion in an inactive organic solvent or a dispersion in a plasticizer, but whatever its nature, a composition embodying the invention is a non-aqueous composition, i. e., any water that is present is in such an inappreciable amount as to be insufficient to form a separate phase. In other words, a composition embodying the invention consists of a resin phase comprising the reducing agent, in which pigments and other additives may be dispersed. A composition embodying the invention is not prepared in the form of a water emulsion because the reducing agents ordinarily employed are soluble in water and therefore prevent the formation of a stable emulsion.

Active solvents which may be present in compositions of the invention include ketones (e. g., methyl isobutyl ketone and cyclohexanone), hydrogenated furans (e. g., tetrahydrofuran), and nitroparaffins. Inactive solvents which may be present in compositions of the invention include aromatic hydrocarbons such as benzene, toluene and xylene. The proportion of solvent in which a composition of the invention may be dissolved or dispersed varies in accordance with the properties of the solvent and the composition. For example, the proportion of solvent may range from as low as 2 to 3 per cent of the weight of the polymerization products in the composition to as high as 50 per cent, and is simply the proportion required to produce a solution or dispersion of the desired concentration.

In the preparation of a composition embodying the invention, the reducing agent may be incorporated in the polymerization product either before, simultaneously with, or after the incorporation of other ingredients, the preferred procedure being that which permits the reducing agent to be most intimately incorporated (i. e., most thoroughly dispersed) in the final composition.

The incorporation of the reducing agent in the practice of the present invention may take place at ordinary temperatures, but the reducing agent usually appears to be more effective when incorporated at an elevated temperature. The temperature of incorporation may be any temperature that the composition will stand.

The intimate incorporation of the reducing agent in a composition of the invention may be carried out at ordinary temperatures by means of a ball mill when the composition is in solid form, or by means of any desired dispersing apparatus when the composition is in liquid form or in the form of a liquid solution or dispersion. Many of the present compositions are solids at ordinary temperatures, so that it ordinarily is most convenient to incorporate the reducing agent at an elevated temperature at which the composition is soft enough to be worked but viscous enough to keep the reducing agent in suspension. Any desired apparatus, such as a two-roll rubber mill, a Banbury mixer, a ball mill or a three-roll paint mill may be used for incorporating the reducing agent in the composition. The period of time required to incorporate the reducing agent is simply that necessary to disperse the reducing agent in the composition to the desired degree. If the incorporation is carried out at ordinary temperatures, the properties of the product sometimes may be improved by holding the product at an elevated temperature in an alkaline condition after the incorporation of the reducing agent. The time required for such a heat treatment decreases as the temperature increases and depends upon whether it is desired to impart the best possible properties to the product or to impart intermediate properties by a shorter heat treatment.

In many cases it is desirable to incorporate plasticizers in compositions of the invention in order to plasticize sufficiently the polymerization product, i. e., to obtain the physical properties, such as flexibility, which are imparted by plasticizers. The proportion and type of plasticizer used depend entirely upon the physical properties desired in the final product. It is desirable that the proportion of plasticizer in compositions embodying the invention be such that the plasticizer may be considered to be in solution in the polymerization product. Any of the usual plasticizers, lubricants and dispersing agents which are compatible with the polymerization product may be incorporated in the polymerization product at the same time as the reducing agent, and those which are liquids may be incorporated also by stirring in while the polymerization product is fused.

Plasticizers which may be used in the practice of the invention include the standard commercial esters and other derivatives of phthalic, phosphoric, sebacic, glycolic, oleic, ricinoleic, toluenesulfonic, stearic and other fatty acids (the most commonly used of which are compounds such as diethylhexyl phthalate and dibutyl sebacate), and polymeric materials such as glycerol adipates, glycerol sebacates, other alkyd resins, polyisobutylenes, butadiene-acrylonitrile copolymers, polyvinylbenzene and other natural and synthetic resins. Esters, metal salts and other derivatives of stearic, ricinoleic and synthetic fatty acids, such as diethylene glycol monostearate, propylene glycol polyricinoleate, the stearate of the methyl ether of ethylene glycol, and butyl stearate, oils, modified oils and derivatives of oils such as castor oil, blown castor oil, and mineral oils, natural and synthetic waxes and polyethylene glycols may also be incorporated as lubricating and dispersing agents.

Some plasticizers are volatile substances which do not remain permanently in the compositions in which they are incorporated. When a composition is desired which will remain flexible and resist cracking over a long period of time (i. e., a period of years), the use of a permanent type of plasticizer, i. e., one which has essentially no vapor pressure and thus is not readily removed (for example, by evaporation) from the composition in which it is incorporated, is often necessary. Butadiene-acrylonitrile copolymers have been found to be particularly useful as permanent-type plasticizers, in compositions comprising the polymerization products hereinbefore described. Butadiene-acrylonitrile copolymers, however, are lacking in resistance to heat, light, etc., and their use heretofore has posed a serious problem in the stabilization of compositions in which they were incorporated.

It has been discovered that the reducing agents used in the practice of the present invention not only impart stability to compositions comprising a product of the polymerization of a composition comprising an alpha-chloro-substituted ethylene, but also impart stability to compositions comprising a combination of such a polymerization product with one of the butadiene-acrylonitrile copolymers that are commonly used as plasticizers. The fact that the reducing agents described herein are extremely effective in stabilizing the combination of the first-mentioned polymerization product with a butadiene-acrylonitrile permanent plasticizer (as is hereinafter demonstrated) makes it possible to obtain materials which remain stable toward light, heat etc. and are flexible and free from cracking over long periods of time (i. e., periods of years). Thus, compositions of improved stability and durability which comprise, in addition to a polymerization product and a reducing agent (as hereinbefore described), a copolymer of butadiene with acrylonitrile are a particularly important aspect of the present invention.

Ordinarily, a copolymer of butadiene with acrylonitrile which acts as a plasticizer in a composition embodying the invention may comprise from 15 to 45 per cent of acrylonitrile, and the proportion of such a copolymer in the composition may be from 10 to 50 per cent of the first-mentioned polymerization product.

Fillers and pigments, such as calcium carbonate, silicates, clay, barium sulfate, carbon black, wood flour, titanium dioxide, calcium sulfate, iron oxides, iron blues, chromium yellows, chromium greens, cadmium selenides and other inorganic and organic fillers and coloring materials, may be incorporated in a composition of the invention at the same time as the reducing agent. The incorporation of such ingredients is often desirable since they may have the effect of "screening" or decreasing the amount of light which enters the body of the composition, and thereby increasing the life of the composition when exposed to light. The intended use of the composition determines to a certain extent the agents or ingredients to be incorporated in the composition; but, of course, the ingredients must be compatible in the sense that they are capable of forming a stable suspension, dispersion or solution. Logically, if any substantial quantity of fillers, pigments or opacifiers is used in the composition, the highest degree of compatibility or uniformity may not be required.

Transparent compositions of the invention may be used as molding compositions for fabrication by injection, compression, extrusion and the like, or as compositions for coating metals, or for coating, bonding or impregnating textiles, paper, wood, leather and other materials, or may be used for the production of fibers, filaments and the like.

Filled or pigmented compositions of the invention may be used to produce opaque or translucent coatings, moldings, extrusions, fibers, filaments and the like.

The superiority in stability and durability of compositions of the invention which comprise a reducing agent (as hereinbefore described) as a stabilizer, over compositions which are the same except that they either contain no stabilizer or contain, instead of such a reducing agent, another substance heretofore used as a stabilizer, is demonstrated by the following tests:

(a) A mixture of a polymerization product (100 parts of high molecular weight polyvinyl chloride), a reducing agent (6½ parts of $Na_2S_2O_3.5H_2O$), plasticizers (33 parts of a copolymer consisting of about 67 per cent butadiene and about 33 per cent of acrylonitrile, 45 parts of di-2-ethylhexyl phthalate, 8 parts of tricresyl phosphate, and 10 parts of a glycerol adipate polyester having an acid number less than 2 and a viscosity of 30 poises at 25 degrees C.), and a lubricant (1.4 parts of calcium stearate) is milled on a two-roll rubber mill for ten minutes at 310 degrees F. and then calendered for five minutes at 325 degrees F. to produce a clear film. In a standard oxygen bomb aging test the film is unchanged after 30 days (in a bomb at 158 degrees F. containing molecular oxygen at a pressure of 300 pounds per square inch). A clear film of a composition prepared by a procedure that is the same except that, in place of $Na_2S_2O_3.5H_2O$, a substance is used which has been commonly employed heretofore as a stabilizer (6½ parts of basic lead silicate) turns brown after ten days in an oxygen bomb under the same conditions.

(b) A mixture of a polymerization product (100 parts of a copolymer consisting of about 90 per cent vinyl chloride and about 10 per cent vinyl acetate). A plasticizer (45 parts of dioctyl phthalate), a lubricant (2 parts of diethylene glycol monostearate) and a reducing agent (5 parts of $Na_2S_2O_3.5H_2O$) is milled for ten minutes on a two-roll rubber mill at 240 degrees F. and then calendered at 240 degrees F. into a sheet .009 inch in thickness. The resulting sheet requires 750 hours of exposure to ultra-violet light at 125 degrees F. in a standard fadeometer in order to cause it to stiffen appreciably so that it is brittle when sharply bent. A sheet of a composition prepared by a procedure that is the same except that the quantity of $Na_2S_2O_3.5H_2O$ is increased to 15 parts does not appreciably stiffen in 1200 hours of such exposure. A sheet of a composition prepared by a procedure that is the same except that the $Na_2S_2O_3.5H_2O$ is omitted stiffens appreciably, so that it is brittle when sharply bent, after 150 hours of such exposure. A sheet prepared by a procedure that is the same except that the diethylene glycol monostearate is omitted and the $Na_2S_2O_3.5H_2O$ is reduced to 3 parts requires 270 hours of such exposure to produce the same degree of stiffening and embrittlement, and if immersed in running water for 15 hours after calendering requires 202 hours of such exposure to produce the same degree of stiffening and embrittlement. A sheet prepared by a procedure that is the same except that the diethylene glycol monostearate is omitted and the $Na_2S_2O_3.5H_2O$ is replaced by two parts of $Na_2S_2O_4.2H_2O$ requires 240 hours of such exposure to produce the same degree of stiffening and embrittlement. A sheet prepared by a procedure that is the same except that the quantity of $Na_2S_2O_3.5H_2O$ is 4 parts, and 1 part of phenyl salicylate and 5 parts of blown castor oil are added, requires 720 hours of such exposure to produce the same degree of stiffening and embrittlement, or is unchanged after three months of outdoor exposure in southern Florida, or if immersed in running water for 15 hours after calendering requires 660 hours of such exposure to produce the same degree of stiffening and embrittlement.

(c) A composition of the type used in the form of a solution or dispersion to flame-proof cotton and rayon fabrics is prepared by milling a mixture of 100 parts of a polymerization product (a copolymer consisting of about 90 parts of vinyl chloride and about 10 parts of vinyl acetate), 50 parts of zinc borate, 150 parts of antimony oxide, 75 parts of calcium carbonate, 30 parts of tricresyl phosphate, 20 parts of dioctyl phthalate, 7 parts of aluminum distearate, 1 part of phenyl salicylate, 5 parts of basic lead carbonate, 100 parts of chlorinated paraffin containing 42 per cent by weight of combined chlorine and 10 parts of a reducing agent ($Na_2S_2O_3.5H_2O$) for ten minutes on a two-roll rubber mill at 220° F. and then calendering at 220° F. on a three-roll calender into a sheet .01 inch in thickness. The resulting sheet requires 140 hours of exposure in the fadeometer in order to cause it to stiffen appreciably and turn black. A sheet prepared by a procedure that is the same except that the $Na_2S_2O_3.5H_2O$ is omitted requires only 40 hours of such exposure to produce the same degree of deterioration.

(d) A vinyl chloride-vinyl acetate copolymer stock containing 4 to 5 per cent by weight of sodium thiosulfate, similar to the first composition described in (b) above, is subjected to 1500 cycles of abrasion in a Wyzenbeek and Staff abrasion machine. The reduction in thickness is .0022 inch, whereas a stock prepared by a procedure that is the same except that the sodium thiosulfate is omitted suffers a reduction in thickness of .0038 inch when subjected to the same treatment. When the proportion of sodium thiosulfate used in making the stock is increased, the toughness of the stock is very appreciably increased.

(e) A mixture of 100 parts of a polymerization product (a copolymer consisting of about 90 parts of vinyl chloride and about 10 parts of vinyl acetate), 45 parts of dioctyl phthalate, and a reducing agent (10 parts of $Na_2S_2O_3.5H_2O$) is compounded on a two-roll rubber mill. The resulting product is then dissolved in twenty times its weight of a solvent consisting of equal parts of methyl isobutyl ketone and cyclohexanone. After the resulting solution has been allowed to stand for 48 hours, its viscosity, measured at 69° F. by its braking effect on the rotor of a standard viscosimeter operating at 60 revolutions per minute, is 12.41 centipoises. The viscosity, measured by the foregoing procedure, of a composition which is the same except that the amount of $Na_2S_2O_3.5H_2O$ is reduced to seven parts is 12.21 centipoises; when the amount of $Na_2S_2O_3.5H_2O$ is reduced to five parts the viscosity is 11.9 centipoises; when the $Na_2S_2O_3.5H_2O$ is omitted, the viscosity is 11.77 centipoises.

As the results in the tests described above indicate, compositions embodying the invention have superior resistance to heat and light (tests (b) and (c)), superior abrasion resistance and strength (test (d)) and superior mechanical properties due to molecular structure (test (e)). Furthermore, although the presence of a butadiene-acrylonitrile plasticizer in a composition comprising the product of the polymerization of an alpha-chloro-substituted ethylene heretofore has tended to decrease the stability of such a composition, a composition of the invention which comprises a reducing agent, as hereinbefore described, along with such a plasticizer, possesses remarkable stability and durability in use (as evidenced by the results of a standard oxygen bomb aging test, (a)).

The fact that a reducing agent, in a composition embodying the invention, that is a combination of lead thiosulfate and sodium thiosulfate produces even greater stability than sodium thiosulfate alone may be demonstrated by the following test:

A mixture of a polymerization product (100 parts of a copolymer consisting of about 95 per cent of vinyl chloride and about 5 per cent of vinyl acetate), a reducing agent (5 parts of sodium thiosulfate), plasticizers (50 parts of dioctyl phthalate and 12.5 parts of a sebacic acid polyester, "Paraplex G-25") and a lubricant (2 parts of diethylene glycol monostearate) is milled on a two-roll rubber mill for ten minutes at 300 degrees F. and calendered to produce a sheet .01 inch in thickness.

When the resulting sheet is subjected to a heat aging test by heating it in a convection oven at 250 degrees F. for 135 minutes and then at 300 degrees F. for 180 minutes, it develops a yellow cast and stiffens very slightly. If on the other hand the calendered sheet thus produced is exposed at 180 degrees F. in a standard fadeometer, it remains unchanged in shade and flexibility for 220 hours. If in the foregoing procedure the quantity of sodium thiosulfate is increased to 10 parts, the resulting sheet develops a very light yellowish cast but is unchanged in flexibility in the heat-aging treatment, and is unchanged in shade and flexibility by 300 hours of exposure in the fadeometer. If on the other hand, in the foregoing procedure, a mixture of one part of lead thiosulfate and four parts of sodium thiosulfate is substituted for the five parts of sodium thiosulfate, the resulting sheet is unchanged in shade and flexibility in the heat-aging treatment, and is unchanged in shade and flexibility by 320 hours of exposure in the fadeometer.

As the results last mentioned indicate, the combination of lead thiosulfate with sodium thiosulfate is more effective than sodium thiosulfate alone. The high effectiveness of the sodium salts is believed to be due to their compatibility with the polymerization products. Because of such compatibility the sodium salts are believed to act as carriers for the less soluble salts of other metals so as to bring the salts of the other metals into sufficiently intimate contact with the polymerization products so that the great effectiveness of the salts of the other metals may be realized.

The following examples illustrate the practice of the invention.

Example 1

A composition embodying the invention is prepared as follows:

A mixture of a polymerization product (100 parts of high molecular weight polyvinyl chloride), a reducing agent 5 parts of $Na_2S_2O_3.5H_2O$)

lubricants (1 part of calcium stearate and 3 parts of a high-melting synthetic wax), fillers and pigments (88 parts of calcium carbonate, 1 part of phthalocyanine blue, 33 parts of lead chromate, and 2 parts of carbon black) and plasticizers (44 parts of triphenyl phosphate, 44 parts of a glycerol sebacate polyester having an acid number not higher than 2 and a viscosity of 1500 poises at 25 degrees C., and 25 parts of a copolymer consisting of 67 parts of butadiene and 33 parts of acrylonitrile) is milled for ten minutes on a two-roll rubber mill at 310 degrees F., and then calendered for five minutes (on a three-roll calender at 325 degrees F.) on 1.14 broken twill to a total weight of 20 ounces per square yard. The resulting material is unchanged after 1,000 hours in a standard Weatherometer unit (as hereinbefore described). After 1,300 hours of exposure in a standard fadeometer test, the material shows no change in shade, and it cracks only after 1,358 hours of exposure. In a standard oxygen bomb aging test the material is unchanged after 30 days (in a bomb at 158 degrees F. containing molecular oxygen under a pressure of 300 pounds per square inch). After 27 consecutive months of exposure to natural weathering conditions in Miami, Florida, the material shows no change other than a very slight stiffening. In a heat aging test the material is unchanged after 11 hours in a convection oven at a temperature of 300 degrees F.

Similar results are obtained when the procedure described in the preceding paragraph is carried out using 5 parts of any one of the following reducing agents in place of the $Na_2S_2O_3.5H_2O$:

lead thiosulfate, barium thiosulfate, cadmium thiosulfate or potassium thiosulfate.

Example 2

A mixture of a polymerization product (100 parts of a copolymer consisting of about 95 parts of vinyl chloride and about 5 parts of vinyl acetate), a reducing agent (5 parts of $Na_2S_2O_3$), a plasticizer (60 parts of dioctyl phthalate) and lubricants (1 part of phenyl salicylate and 5 parts of blown castor oil) is milled for ten minutes on a two-roll rubber mill at 300 degrees F. and then calendered for five minutes at 300 degrees F. to produce a sheet .009 inch in thickness. The resulting sheet stiffens appreciably (so that it is cracked when sharply bent) only after 750 hours of exposure in the fadeometer, and is unchanged after three months of outdoor exposure in Miami, Florida. In sharp contrast, a sheet prepared by a procedure that is the same except that the $Na_2S_2O_3$ is omitted requires only 75 hours of exposure in the fadeometer to produce the same degree of stiffening and embrittlement.

Example 3

A mixture of a polymerization product (100 parts of a copolymer consisting of about 85 parts of vinyl chloride and about 15 parts of vinyl acetate), a reducing agent (5 parts of $Na_2S_2O_3.5H_2O$)

a plasticizer (35 parts of dioctyl phthalate) and a lubricant (2 parts of diethylene glycol monostearate) is milled for ten minutes on a two-roll rubber mill at 190 degrees F. and then calendered for five minutes on a three-roll calender to produce a sheet .01 inch in thickness. The resulting sheet shows no change in shade or flexibility after 460 hours of exposure in the fadeometer. In contrast, a sheet produced by a procedure that is the same except that the $Na_2S_2O_3.5H_2O$ is omitted shows changes in shade and flexibility after only 80 hours of exposure in the fadeometer.

Example 4

A mixture of a polymerization product (100 parts of a copolymer consisting of about 90 parts of vinyl chloride and about 10 parts of vinylidene chloride), a reducing agent (5 parts of $$Na_2S_2O_3.5H_2O)$$

a plasticizer (50 parts of dioctyl phthalate) and a lubricant (2 parts of diethylene glycol monostearate) is milled for ten minutes on a two-roll rubber mill at 260 degrees F. and then calendered for five minutes on a three-roll calender at 260 degrees F. to produce a sheet .01 inch in thickness. The resulting sheet shows no change in shade or flexibility after 300 hours in the fadeometer. A sheet produced by a procedure that is the same except that the quantity of $Na_2S_2O_3.5H_2O$ is increased to 10 parts can be exposed in the fadeometer for more than 600 hours without change in shade or flexibility. In contrast, a sheet produced by a procedure that is the same except that the $Na_2S_2O_3.5H_2O$ is omitted can be exposed in the fadeometer for only 90 hours without change in shade or flexibility.

This is a continuation-in-part of application Serial No. 605,457, filed July 16, 1945, now abandoned.

Having described the invention, I claim:

1. An alkaline composition of improved stability and durability which comprises (a) the product of the polymerization of a composition comprising an alpha-chloro-substituted ethylene having from one to two alpha-chloro substituents and (b) a reducing agent that is a salt having an anion of the class consisting of the $[S_2O_4]^=$ and $[SXO_3]^=$ anions, wherein X is a chalkogen of the class consisting of sulfur and selenium, intimately incorporated with said polymerization product in an amount from 1 to 20 per cent of the weight thereof.

2. An alkaline composition of improved stability and durability which comprises (a) the product of the polymerization of a composition comprising an alpha-chloro-substituted ethylene having from one to two alpha-chloro substituents and (b) a reducing agent that is a salt having a $(SXO_3)^=$ anion, wherein X is a chalkogen of the class consisting of sulfur and selenium, intimately incorporated with said polymerization product in an amount from 1 to 20 per cent of the weight thereof.

3. An alkaline composition of improved stability and durability as claimed in claim 2, wherein the reducing agent is a thiosulfate of a metal.

4. An alkaline composition of improved stability and durability as claimed in claim 2, wherein the reducing agent is a thiosulfate of an alkali metal.

5. An alkaline composition of improved stability and durability as claimed in claim 2, wherein the reducing agent is a hydrated thiosulfate of an alkali metal.

6. An alkaline composition of improved stability and durability which comprises (a) the product of the polymerization of a composition comprising vinyl chloride and (b) sodium thiosulfate, intimately incorporated with said polymerization product in an amount from 1 to 20 per cent of the weight thereof.

7. An alkaline composition of improved stability and durability which comprises (a) the product of the polymerization of a composition comprising vinyl chloride and (b) $Na_2S_2O_3.5H_2O$, intimately incorporated with said polymerization product in an amount from 1 to 20 per cent of the weight thereof.

8. An alkaline composition of improved stability and durability which comprises (a) the product of the polymerization of a composition comprising vinyl chloride and (b) sodium thiosulfate and lead thiosulfate, intimately incorporated with said polymerization product, the total amount of said thiosulfates being from 1 to 20 per cent of the weight of said polymerization product.

9. An alkaline composition of improved stability and durability which comprises (a) the product of the polymerization of a composition comprising an alpha-chloro-substituted ethylene having from one to two alpha-chloro-substituents, (b) a reducing agent that is a salt having an anion of the class consisting of the $[S_2O_4]^=$ and $[SXO_3]^=$ anions, wherein X is a chalkogen of the class consisting of sulfur and selenium, intimately incorporated with said polymerization product in an amount from 1 to 20 per cent of the weight thereof and (c) a copolymer of butadiene and acrylonitrile.

10. An alkaline composition of improved stability and durability as claimed in claim 9, wherein the reducing agent is a thiosulfate of a metal.

11. An alkaline composition of improved stability and durability as claimed in claim 9, wherein the reducing agent is a hydrated thiosulfate of an alkali metal.

12. An alkaline composition of improved stability and durability which comprises (a) the product of the polymerization of a composition comprising vinyl chloride, plasticized with a copolymer of butadiene and acrylonitrile and (b) sodium thiosulfate, intimately incorporated therein in an amount from 1 to 20 per cent of the weight of said polymerization product.

CHARLES J. CHABAN.

REFERENCES CITED

The following references are of record in the file of this patent:

UNITED STATES PATENTS

| Number | Name | Date |
|---|---|---|
| 2,227,985 | Swann | Jan. 7, 1941 |
| 2,364,410 | Whittaker | Dec. 5, 1944 |
| 2,387,571 | Fikentscher | Oct. 23, 1945 |

FOREIGN PATENTS

| Number | Country | Date |
|---|---|---|
| 444,636 | Great Britain | Mar. 24, 1936 |